(12) United States Patent
Birdsall et al.

(10) Patent No.: US 8,563,460 B2
(45) Date of Patent: *Oct. 22, 2013

(54) SHAPED HETEROGENEOUS CATALYSTS

(75) Inventors: David James Birdsall, Stockton-on-Tees (GB); Mileta Babovic, Newcastle upon Tyne (GB); Mikael Per Uno Carlsson, Stockton-on-Tees (GB); Samuel Arthur French, Neasham (GB); Michiel Nijemeisland, Darlington (GB); William Maurice Sengelow, Billingham (GB); Edmund Hugh Stitt, Billingham (GB)

(73) Assignee: Johnson Matthey PLC, London (GB)

( * ) Notice: Subject to any disclaimer, the term of this patent is extended or adjusted under 35 U.S.C. 154(b) by 305 days.

This patent is subject to a terminal disclaimer.

(21) Appl. No.: 13/063,627

(22) PCT Filed: Aug. 24, 2009

(86) PCT No.: PCT/GB2009/051052
§ 371 (c)(1),
(2), (4) Date: Mar. 11, 2011

(87) PCT Pub. No.: WO2010/029324
PCT Pub. Date: Mar. 18, 2010

(65) Prior Publication Data
US 2011/0172086 A1 Jul. 14, 2011

(30) Foreign Application Priority Data
Sep. 12, 2008 (GB) .................... 0816705.8

(51) Int. Cl.
| B01J 21/18 | (2006.01) |
| B01J 27/236 | (2006.01) |
| B01J 23/00 | (2006.01) |
| B01J 23/10 | (2006.01) |
| B01J 23/40 | (2006.01) |
| B01J 23/42 | (2006.01) |
| B01J 23/58 | (2006.01) |
| B01J 23/56 | (2006.01) |
| B01J 23/02 | (2006.01) |
| B01J 23/08 | (2006.01) |
| B01J 21/04 | (2006.01) |
| C10G 35/00 | (2006.01) |
| C10G 45/00 | (2006.01) |
| C10G 17/00 | (2006.01) |
| C01B 21/00 | (2006.01) |
| C01C 1/00 | (2006.01) |
| C07C 27/00 | (2006.01) |
| C07C 27/06 | (2006.01) |

(52) U.S. Cl.
USPC ........... 502/170; 502/174; 502/176; 502/300; 502/304; 502/305; 502/306; 502/308; 502/311; 502/313; 502/317; 502/319; 502/321; 502/323; 502/324; 502/325; 502/326; 502/330; 502/332; 502/340; 502/344; 502/349; 502/355; 502/439; 502/527.14; 502/527.18; 502/527.19; 264/15; 264/629; 264/681; 208/133; 208/142; 208/251 R; 208/208 R; 423/351; 423/352; 518/700; 518/713; 518/714; 518/715

(58) Field of Classification Search
USPC ......... 502/170, 174, 176, 300, 305–355, 439, 502/527.14, 527.18, 527.19; 264/15, 629, 264/681
See application file for complete search history.

(56) References Cited

U.S. PATENT DOCUMENTS

| 2,212,932 A | * | 8/1940 | Fairlie | ............................ 261/94 |
| 2,408,164 A | | 9/1946 | Foster | |
| 3,764,565 A | | 10/1973 | Jacobs | |
| 4,328,130 A | | 5/1982 | Kyan | |
| 4,394,303 A | | 7/1983 | Gibson | |
| 4,402,870 A | * | 9/1983 | Schurmans | .................. 502/439 |
| 4,441,990 A | | 4/1984 | Huang | |
| 4,517,077 A | | 5/1985 | Clements | |
| 4,656,157 A | | 4/1987 | Hofmann | |
| 6,005,121 A | | 12/1999 | Ebner | |

| | | | |
|---|---|---|---|
| 6,518,220 B2* | 2/2003 | Walsdorff et al. | 502/346 |
| 7,351,393 B1 | 4/2008 | Bayense | |
| 7,799,730 B2 | 9/2010 | Ringer | |
| 2001/0029235 A1 | 10/2001 | Walsdorff | |
| 2004/0043900 A1* | 3/2004 | Combs | 502/439 |
| 2007/0032680 A1* | 2/2007 | Felder et al. | 562/535 |
| 2012/0171407 A1* | 7/2012 | Richard et al. | 428/80 |

FOREIGN PATENT DOCUMENTS

| | | |
|---|---|---|
| CA | 1194012 | 9/1985 |
| CN | 2388204 Y | 7/2000 |
| CN | 2684922 | 3/2005 |
| CN | 2686721 Y | 3/2005 |
| CN | 1213808 | 8/2005 |
| EP | 0220933 | 5/1987 |
| EP | 0464633 | 1/1992 |
| EP | 591572 | 4/1994 |
| EP | 0998976 | 5/2000 |
| EP | 1792651 | 6/2007 |
| GB | 893987 | 4/1962 |
| SU | 957948 | 9/1982 |
| WO | 9301155 | 1/1993 |
| WO | 02087756 | 11/2002 |
| WO | 03013725 | 2/2003 |
| WO | 2004014549 | 2/2004 |
| WO | 2006114320 | 11/2006 |
| WO | 2008087149 | 7/2008 |

OTHER PUBLICATIONS

International Search Report for PCT/GB2009/051052 dated Dec. 10, 2009.

* cited by examiner

*Primary Examiner* — Patricia L Hailey

(74) *Attorney, Agent, or Firm* — RatnerPrestia

(57) ABSTRACT

A catalyst unit is described comprising a cylinder with a length C and a diameter D, wherein said unit has five holes arranged in a pentagonal pattern extending longitudinally therethrough, with five flutes running along the length of the unit, said flutes positioned equidistant adjacent holes of said pentagonal pattern. The catalyst may be used particularly in steam reforming reactors.

20 Claims, 2 Drawing Sheets

5H-P          5H-Q

SHAPED HETEROGENEOUS CATALYSTS

CROSS-REFERENCE TO RELATED APPLICATIONS

This application is the U.S. National Phase application of PCT International Application No. PCT/GB2009/051052, filed Aug. 24, 2009, and claims priority of British Patent Application No. 0816705.8, filed Sep. 12, 2008, the disclosures of both of which are incorporated herein by reference in their entirety for all purposes.

FIELD OF THE INVENTION

This invention relates to shaped heterogeneous catalysts.

BACKGROUND OF THE INVENTION

Heterogeneous catalysts are typically provided as particulate beds through which a liquid and/or gaseous reactant mixture is passed, often at elevated temperature and pressure. Therefore heterogeneous catalytic materials are often provided in shaped form to provide a balance of catalytic activity and throughput. In general, smaller catalyst particles have a higher surface area, and therefore activity, but provide lower throughput because the pressure drop through the catalyst bed is higher. To counter this, various catalyst designs have been used, which may have one of more through holes in an attempt to increase the geometric surface area and minimise pressure drop.

WO 2004/014549 discloses shaped heterogeneous catalysts for gaseous reactions, comprising a cylindrical unit having a diameter to height ratio in the range between about 0.5:1 to 1:1 and having a plurality of shaped holes of non-circular cross-section therethrough. Some embodiments additionally have two, three or four V-shaped flutes or channels running along the external length of the cylinder.

SUMMARY OF THE INVENTION

Whereas both flutes and holes may increase the theoretical geometric surface area (GSA), the strength of the pellets generally is reduced with increasing number of holes and flutes. Historically, although 4-, 7- and 10-holed pellets are produced, the strength and geometric surface area may still not always be sufficient for the most demanding uses. We have designed catalyst units that overcome the problems associated with such designs.

Accordingly the invention provides a catalyst unit comprising a cylinder with a length C and a diameter D, wherein said unit has five holes arranged in a pentagonal pattern extending longitudinally therethrough, with five flutes running along the length of the unit, said flutes positioned equidistant adjacent holes of said pentagonal pattern.

The invention further provides a method of making a catalyst unit comprising the steps of (i) feeding a powdered support material, optionally with a pelleting aid, into a pelleting die, (ii) compressing the powder to form a shaped unit and then (iii) optionally heating the shaped unit to form the catalyst unit, said die being shaped such that the catalyst unit is in the form of a cylinder with a length C and a diameter D, wherein said unit has five holes arranged in a pentagonal pattern extending longitudinally therethrough, with five flutes running along the length of the unit, said flutes positioned equidistant adjacent holes of said pentagonal pattern.

The invention further provides a catalytic process using a catalyst comprising the catalyst unit by contacting a reactant mixture, preferably a gaseous reactant mixture, with the catalyst under conditions to effect the catalysed reaction.

DETAILED DESCRIPTION OF THE INVENTION

Figure 1:
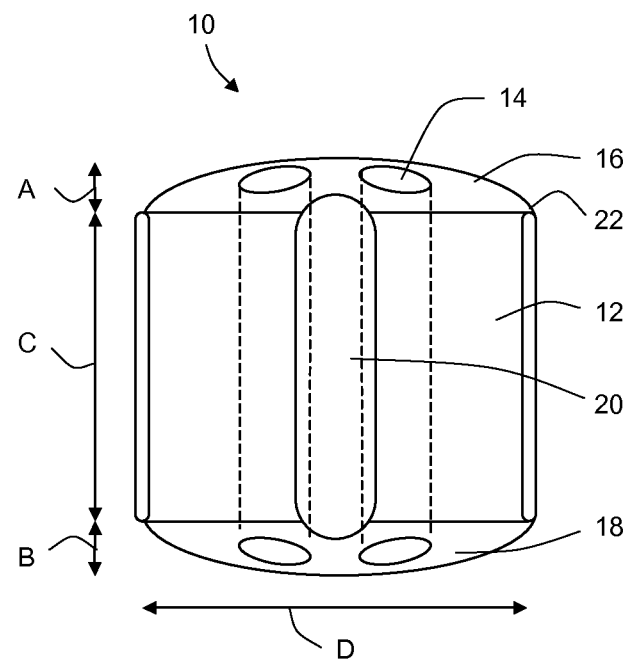
FIG. 1 is a side view depiction of a catalyst unit according to the present invention and FIG. 2 is and end view showing the top of the catalyst unit of FIG. 1.

We have found that 5-holed pentalobal catalyst units offer higher geometric surface area and strength than previous catalyst units.

For the majority of catalytic uses, C is preferably in the range 2 to 25 mm and D is preferably in the range 4 to 40 mm.

The catalyst unit may be flat-topped or have domed ends. Preferably the cylinder has domed ends of lengths A and B. One or both ends of the cylinder, preferably both ends are domed. A and B may be the same or different. The dome ratio to the cylindrical part of the catalyst unit (i.e., (A+B)/C) may in the range 0.10 to 0.40. Alternatively the dome ratio may be in the range 0.40 to 5.00, so as to provide a relatively highly domed structure in which the holes are more accessible than prior art structures when the units are placed in a packed bed. In these embodiments, preferably (A+B)/C is in the range 0.4 to 3.00. The domed ends form segments of a circle or ellipse in cross-section and desirably have a radius $R \geq D/2$.

The aspect ratio of the catalyst unit, which may be defined as overall length divided by the diameter, i.e., C/D or where there are domed ends (A+B+C)/D, is desirably in the range 0.5 to 2.0. Preferably (A+B+C)/D is in the range 0.75 to 1.50 as this reduces the tendency of the units to stack while at the same time providing a reduced tendency to break.

The catalyst unit has five holes extending axially therethrough along its length. The holes should desirably be symmetrically positioned about the cross section of the cylinder so as to maximise the resulting strength of the catalyst. We have found a pentagonal pattern maximises the resulting strength of the pellet, compared with e.g. holes in a square pattern with a central hole. It is a feature of the present invention that the catalyst unit does not have a central hole. The pentagonal pattern in the present invention need not be a perfect pentagon with each of the sides of identical length, but this is preferred. Thus in the arrangement according to the present invention there are five flutes or channels creating five lobes (i.e., pentalobal), each with a hole equally spaced from the neighbouring flutes or channels.

The holes may be circular in cross-section or have one or more of the variety of cross-sections disclosed in the aforesaid WO 2004/014549. In a preferred embodiment, all the holes are circular in cross-section as this maximises the strength of the resulting catalyst unit.

The holes may be the same size or different sizes. Preferably hole or holes have a circular cross-section and independently have a diameter d' in the range of 0.05 D to 0.5 D, more preferably 0.1 D to 0.3 D.

The catalyst unit has five flutes running along its length. Preferably the flutes are straight and run axially lengthwise along the exterior of the catalyst unit as this simplifies fabrication. The shape of the flutes may be semicircular, elliptical, U-shaped, V-shaped, ∏-shaped or a combination of these.

The flutes or channels are symmetrically positioned such that they are equidistant adjacent holes of said pentagonal pattern, i.e. the centre of each of the flutes forms a symmetrical triangle with the centres of two adjacent holes. Where the holes are arranged in a perfect pentagon, all the flutes are equally spaced around the circumference of the catalyst unit. Where the flutes are semi-circular or elliptical they may independently have a diameter d", width or depth in the range of 0.05 D to 0.5 D, more preferably 0.1 D to 0.333 D.

We have found that it is desirable to limit the total flute width, i.e. the combined opening, to ≤35% of the circumference of the unit, i.e. ≤0.35($\pi$D), as this prevents undesirable interlocking of adjacent units in a catalyst bed. Interlocking can reduce flow but also can give rise to broken catalyst due to leverage.

In order to assist in the fabrication process, one or both domed ends may be positioned to provide a lip on one or both ends of the cylinder portion of the shaped unit. The width, w', of the lip is desirably in the range 0.2 to 2.0 mm.

The catalyst units may be fabricated from a powdered composition containing one or more catalytically active metals thereby generating the catalyst directly or may fabricated from one or more powdered catalyst support materials and the resulting unit then treated e.g. by impregnation or deposition with one or more metal compounds to form the catalyst.

The catalyst unit may be fabricated using a powdered metal, metal oxide, metal hydroxide, metal carbonate, metal hydroxycarbonate or mixture thereof.

Powdered compositions containing catalytically active metals may be prepared by mixing the respective metal oxides, carbonates, hydroxides or hydroxycarbonates, or may be formed by known precipitation techniques, whereby a mixture of soluble salts is precipitated, e.g. using an alkaline precipitating agent, dried and optionally calcined.

Preferred catalyst support materials are selected from powdered alumina, titania, zirconia, metal-aluminate, or a mixture thereof, which may contain one or more stabilising compounds such as Lanthana, silica and potassium oxide. Catalyst units fabricated with these may be termed shaped catalyst support units, and the final catalyst will therefore further comprise one or more metal compounds that have been impregnated into and/or deposited on said shaped catalyst support unit.

The catalyst units preferably comprise one or more metals selected from Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, or Ce.

The catalyst units may be fabricated using any of the known catalyst formulations using established methods.

In one embodiment, the catalyst unit comprises one or more transition metals such as nickel, cobalt, iron or copper, and/or one or more precious metals such as platinum, palladium, rhodium iridium or ruthenium that are present in the form of the metal, an oxide, hydroxide, carbonate or hydroxycarbonate.

In an alternative embodiment, the catalyst unit comprises one or more transition metals, such as nickel, copper, cobalt or iron and/or precious metals such as platinum, palladium, rhodium iridium or ruthenium, that have been impregnated into or deposited on a refractory catalyst support material such as an alumina-, calcium aluminate-, magnesium aluminate- or zirconia-based shaped catalyst support unit.

The transition metal and precious metal content in such catalysts may be up to 85% by weight, but is preferably in the range 1-60% by weight.

Pelleting is the preferred fabrication method for the present invention. The method for fabricating the catalyst unit may therefore comprise the steps of (i) feeding a powdered material, optionally with a pelleting aid or lubricant such as graphite or magnesium stearate, into a pelleting die, (ii) compressing the powder to form a shaped unit and then (iii) optionally heating the shaped unit to form the catalyst unit. The heating step, which may include calcination, may be performed to increase the strength of the catalyst unit.

The powdered material may comprise one or more catalytically active metals in a reduced and/or oxidised form, or may be a catalyst support material, in which case the final catalyst may be prepared by a separate step of impregnating a metal compound into and/or depositing a metal compound onto the shaped catalyst support unit. Known techniques may be applied in order to do this. For example, in one embodiment, a solution of nickel nitrate may be impregnated into the shaped catalyst support unit, dried, and calcined to cause the nickel nitrate to decompose thereby forming a nickel oxide-containing catalyst. Alternatively, the powdered material may be a precipitated composition comprising one or more catalytic metals that has been dried and optionally calcined and/or reduced & passivated.

Alternative fabrication methods maybe used, such as injection moulding, or possibly a two-step procedure of extrusion to form shaped extrudates, followed by forming domes on the extrudates.

The catalyst units containing the catalytic metal compounds may be subjected to various treatments such as reduction with a hydrogen- and/or carbon monoxide-containing gas stream or sulphidation, e.g. with hydrogen sulphide, to render them active in use. The post treatment may be carried out ex-situ or in-situ, i.e. before or after installation in the reactor where it is to be used.

The catalyst unit prepared according to the present invention may be applied to any heterogeneous catalytic process, but is preferably applied to fixed bed processes, more preferably fixed bed processes using gaseous reactants. The catalytic process therefore comprises contacting a reactant mixture, preferably a gaseous reactant mixture, with the catalyst under conditions to effect the catalysed reaction. The catalytic process may be selected from hydroprocessing including hydrodesulphurisation, hydrogenation, steam reforming including pre-reforming, catalytic steam reforming, autothermal reforming and secondary reforming and reforming processes used for the direct reduction of iron, catalytic partial oxidation, water-gas shift including isothermal-shift, sour shift, low-temperature shift, intermediate temperature shift, medium temperature shift and high temperature shift reactions, methanation, hydrocarbon synthesis by the Fischer-Tropsch reaction, methanol synthesis, ammonia synthesis, ammonia oxidation and nitrous oxide decomposition reactions. The catalyst units may also be used to recover heavy metals such as mercury and arsenic from contaminated gaseous or liquid fluid streams.

A preferred use is in the catalytic steam reforming of hydrocarbons wherein a hydrocarbon such as natural gas or naphtha is mixed with steam and passed at elevated temperature and pressure through a bed of catalyst units, typically comprising Ni or another Group VIII metal on a refractory support, disposed in a plurality of externally-heated catalyst tubes. Another preferred use is in autothermal reforming and secondary reforming, wherein a hydrocarbon-containing gas mixture is subjected to partial oxidation with oxygen or air and the resulting heated partially oxidised gas mixture passed through a fixed bed of steam reforming catalyst, again typically comprising Ni or another group VIII metal on a refractory support.

Figure 2:
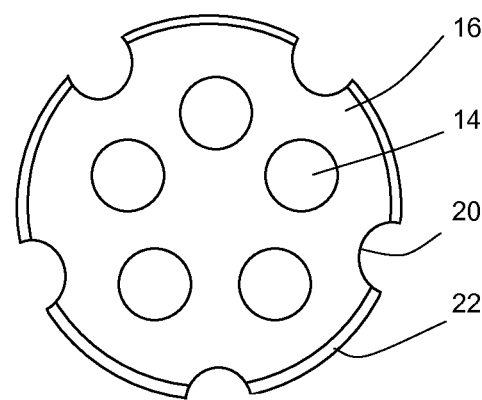

FIGS. 1 and 2 together depict a catalyst unit 10 in the form of a cylinder 12 having a length C and diameter D, which has five symmetrically positioned holes 14 of circular cross-section extending therethrough. The centres of the five holes form an approximate pentagonal pattern. The diameter (d') of each of the four holes is about 0.17 D. The cylinder 12 has domed ends 16, 18 of lengths A and B, which form segments in cross-section. A and B are the same. (A+B+C)/D is about 1.04. (A+B)/C is about 0.34. The catalyst unit has five straight flutes 20 running along its length and equally-spaced around the circumference of the unit. The flutes 20 are positioned equidistant adjacent holes 14. The flutes are all roughly semi-circular and have a diameter (d") about 0.17 D. The unit is provided with a lip 22 where the domed ends 16, 18 join the cylindrical portion 12.

Figure 3:
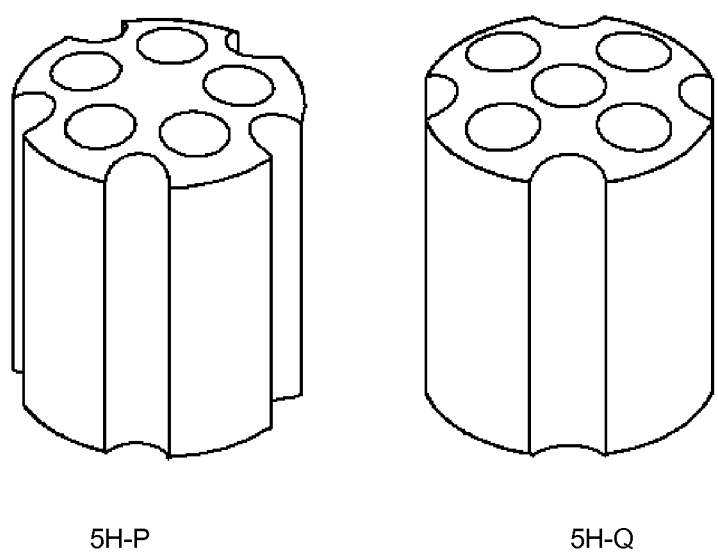
FIG. 3 is an isometric view of a catalyst unit according to the present invention and a comparative catalyst unit.

FIG. 3 shows a 5-holed catalyst unit according to the invention (5H-P) and an alternative unit not according to the present invention (5H-Q). In 5H-Q, the five holes are arranged as a square with a central hole, and accordingly this unit has only 4 flutes. In both cases (A+B+C)/D=1.25.

EXAMPLES

The invention is further illustrated by reference to the following calculated Example.

Example 1

Based on a computational study on the pellets depicted in FIG. 3, the calculated properties of 5H-P (according to the invention) and 5H-Q (not according to the invention), fabricated from the same material are given below.

|  | 5H-Q | 5H-P |
| --- | --- | --- |
| Properties |  |  |
| A mm | 1.0 | 1.0 |
| B mm | 1.0 | 1.0 |
| C mm | 18.0 | 18.0 |
| D mm | 16.0 | 16.0 |
| Flute width/depth mm | 4.0/4.0 | 3.5/2.5 |
| Hole diameter (d') mm | 4.0 | 3.8 |
| Results |  |  |
| Geometric Surface area (m$^2$/m$^3$) | 368.2 | 379.3 |
| Voidage | 109.1 | 109.2 |
| Equivalent Diameter (mm) | 5.24 | 5.18 |
| Strength | 130 | 154 |

The geometric surface area (GSA) is marginally superior but the strength is markedly improved in the design according to the present invention.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A catalyst unit comprising a cylinder with a length C and a diameter D, the catalyst unit having five holes of circular cross-section with a diameter d' in the range of 0.05 D to 0.5 D arranged in a pentagonal pattern extending longitudinally therethrough, with five flutes running along the length of the unit, said flutes positioned equidistant adjacent holes of said pentagonal pattern.

2. A catalyst unit according to claim 1 wherein the cylinder has domed ends of lengths A and B.

3. A catalyst unit according to claim 2 wherein the cylinder of length C has domed ends and an aspect ratio (A+B)/C in the range 0.10 to 5.00.

4. A catalyst unit according to claim 3 wherein the aspect ratio of the unit is in the range 0.5 to 2.00.

5. A catalyst unit according to claim 2 wherein one or both domed ends are positioned to provide a lip on one or both ends of the cylinder.

6. A catalyst unit according to claim 1 wherein the flutes are semi-circular or elliptical and independently have a diameter d", width or depth in the range of 0.05 D to 0.5 D.

7. A catalyst unit according to claim 1 wherein a total flute width is ≤5 35% of a circumference of the catalyst unit.

8. A catalyst unit according to claim 1 comprising a metal or metal compound selected from the group consisting of a metal oxide, metal hydroxide, metal carbonate, and metal hydroxycarbonate, and mixtures thereof.

9. A catalyst unit according to claim 8 wherein the metal or metal compound comprises one or more metals selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce.

10. A catalyst unit according to claim 1 comprising alumina, titania, zirconia or metal-aluminate, or a mixture thereof.

11. A catalyst unit according to claim 1 containing one or more metal compounds that have been impregnated into and/or deposited on said unit.

12. A catalyst unit according to claim 11 wherein the metal compound comprises one or more metals selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce.

13. A method of making a catalyst unit comprising the steps of (i) feeding a powdered material into a pelleting die, and (ii) compressing the powder to form a shaped unit, said die being shaped such that the catalyst unit is in the form of a cylinder having a length C, and a diameter D, the catalyst unit having five holes of circular cross-section with a diameter d' in the range of 0.05 D to 0.5 D arranged in a pentagonal pattern extending longitudinally therethrough, with five flutes running along the length of the unit, said flutes positioned equidistant adjacent holes of said pentagonal pattern.

14. A method according to claim 13 wherein the powdered material is a precipitated composition comprising one or more catalytic metals, that has been dried and optionally calcined and/or reduced & passivated.

15. A method according to claim 13 wherein the powdered material is a catalyst support material.

16. A method according to claim 15 wherein the method further comprises the step of treating the resulting unit by impregnation or deposition with one or more metal compounds.

17. A method according to claim 13 wherein a pelleting aid is included with the powdered material in the pelleting die.

18. A method according to claim 13 further comprising (iii) heating the shaped unit to form the catalyst unit.

19. A catalytic process using a catalyst unit comprising contacting a reactant mixture with the catalyst unit under conditions to effect a catalysed reaction, the catalyst unit comprising a cylinder with a length C and a diameter D, the catalyst unit having five holes of circular cross-section with a diameter d' in the range of 0.05 D to 0.5 D arranged in a pentagonal pattern extending longitudinally therethrough, with five flutes running along the length of the unit, said flutes positioned equidistant adjacent holes of said pentagonal pattern.

20. A catalytic process according to claim 19 selected from hydroprocessing including hydrodesulphurisation, hydrogenation, steam reforming including pre-reforming, catalytic steam reforming, autothermal reforming and secondary reforming and reforming processes used for the direct reduction of iron, catalytic partial oxidation, water-gas shift including isothermal-shift, sour shift, low-temperature shift, intermediate temperature shift, medium temperature shift and high temperature shift reactions, methanation, hydrocarbon synthesis by the Fischer-Tropsch reaction, methanol synthesis, ammonia synthesis, ammonia oxidation and nitrous oxide decomposition reactions, or for the recovery of heavy metals from contaminated gaseous or liquid fluid streams.

* * * * *